(12) United States Patent
Che

(10) Patent No.: US 12,511,893 B2
(45) Date of Patent: Dec. 30, 2025

(54) METHOD, APPARATUS, SYSTEM AND ELECTRONIC DEVICE FOR SELECTING INTELLIGENT ANALYSIS ALGORITHM

(71) Applicant: Hangzhou Hikvision Digital Technology Co., Ltd., Zhejiang (CN)

(72) Inventor: Jun Che, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 749 days.

(21) Appl. No.: 17/776,420

(22) PCT Filed: Nov. 2, 2020

(86) PCT No.: PCT/CN2020/125876
§ 371 (c)(1),
(2) Date: May 12, 2022

(87) PCT Pub. No.: WO2021/093625
PCT Pub. Date: May 20, 2021

(65) Prior Publication Data
US 2022/0405145 A1    Dec. 22, 2022

(30) Foreign Application Priority Data
Nov. 14, 2019    (CN) .......................... 201911114467.8

(51) Int. Cl.
*G06V 10/70* (2022.01)
*G06F 9/50* (2006.01)
*G06T 7/00* (2017.01)
*G06V 20/52* (2022.01)
*H04N 7/18* (2006.01)

(52) U.S. Cl.
CPC .............. *G06V 10/87* (2022.01); *G06F 9/505* (2013.01); *G06F 9/5061* (2013.01);
(Continued)

(58) Field of Classification Search
CPC ...... G06V 10/87; G06V 20/52; G06V 10/993; G06V 10/96; G06V 20/10; G06V 2201/07;
(Continued)

(56) References Cited

U.S. PATENT DOCUMENTS 10,867,495 B1 *   12/2020   Venetianer ....... G08B 13/19671
2012/0179742 A1    7/2012   Acharya et al.
(Continued)

FOREIGN PATENT DOCUMENTS

CN    104410821 A    3/2015
CN    105491329 A    4/2016
(Continued)

*Primary Examiner* — Ming Y Hon
(74) *Attorney, Agent, or Firm* — Bret E. Field; Bozicevic, Field & Francis LLP

(57) ABSTRACT

A method, an apparatus, a system, and an electronic device for selecting an intelligent analysis algorithm. The method includes: acquiring image data of a monitoring scene (S101); analyzing the image data to obtain scene contents contained in the image data (S102); determining an intelligent analysis algorithm corresponding to each of the scene contents (S103); and selecting a target intelligent analysis algorithm(s) from intelligent analysis algorithms corresponding to the scene contents according to a load capacity of a compute node used for loading the intelligent analysis algorithms, wherein a total algorithm load of the target intelligent analysis algorithm(s) is not greater than the load capacity of the compute node (S104). The method for selecting an intelligent analysis algorithm realizes an automatic selection of the intelligent analysis algorithm, which can reduce the manual workload, improve the selection efficiency of the intelligent analysis algorithm, reduce overload of the compute node, reduce abnormal analysis results caused by the overload of the compute node, and reduce an improper selection of the intelligent analysis algorithm due (Continued)

to the low degree of professionalism of the construction personnel, which affects the analysis effect.

14 Claims, 8 Drawing Sheets

(52) U.S. Cl.
CPC ............ *G06T 7/0002* (2013.01); *G06V 20/52* (2022.01); *H04N 7/18* (2013.01)

(58) Field of Classification Search
CPC ...... G06F 9/505; G06F 9/5061; G06F 9/4881; G06T 7/0002; H04N 7/18; H04N 7/181
See application file for complete search history.

(56) References Cited

U.S. PATENT DOCUMENTS

| | | | |
|---|---|---|---|
| 2014/0044377 A1 | 2/2014 | Yachida et al. | |
| 2014/0140572 A1* | 5/2014 | Ranjan | G06V 10/96 382/103 |
| 2016/0080652 A1* | 3/2016 | Shirota | G06K 7/1404 348/222.1 |
| 2016/0225135 A1* | 8/2016 | Young | G06T 7/90 |
| 2016/0379049 A1* | 12/2016 | Yu | G06T 7/194 382/103 |
| 2018/0130255 A1* | 5/2018 | Hazeghi | H04N 23/12 |
| 2018/0213030 A1* | 7/2018 | Choi | H04L 67/56 |
| 2019/0080204 A1* | 3/2019 | Schroff | G06V 10/761 |
| 2019/0114767 A1* | 4/2019 | Muehlberg | G06T 11/008 |
| 2020/0065526 A1* | 2/2020 | Berman | G06T 1/0028 |
| 2020/0202493 A1* | 6/2020 | Brownlee | G06T 5/20 |
| 2020/0218423 A1* | 7/2020 | Ohashi | G06F 3/04186 |
| 2024/0404296 A1* | 12/2024 | Sah | G06V 20/59 |

FOREIGN PATENT DOCUMENTS

| | | |
|---|---|---|
| CN | 107343164 A | 11/2017 |
| CN | 109063667 A | 12/2018 |
| CN | 109145840 A | 1/2019 |

\* cited by examiner

METHOD, APPARATUS, SYSTEM AND ELECTRONIC DEVICE FOR SELECTING INTELLIGENT ANALYSIS ALGORITHM

The present application claims the priority of a Chinese patent application No. 201911114467.8 filed with the China National Intellectual Property Administration on Nov. 14, 2019 and entitled "METHOD, APPARATUS, SYSTEM AND ELECTRONIC DEVICE FOR SELECTING INTELLIGENT ANALYSIS ALGORITHM", which is incorporated herein by reference in its entireties.

TECHNICAL FIELD

The present disclosure relates to the field of computer technology, and in particular, to a method, an apparatus, a system and an electronic device for selecting an intelligent analysis algorithm.

BACKGROUND

With the development of computer vision technology and the improvement of security consciousness of people, video monitoring technology based on intelligent analysis algorithms has spread to all aspects of life. In the related art, after the installation of the monitoring equipment is completed, it is necessary to manually select corresponding intelligent analysis algorithms for the monitoring point corresponding to each monitoring equipment, and the configuration and adjustment are manually performed. However, manual selection of an intelligent analysis algorithm requires a large amount of manual work, and the selection efficiency of the intelligent analysis algorithm is low.

SUMMARY

The purpose of the embodiments of the present disclosure is to provide a method, an apparatus, a system, and an electronic device for selecting an intelligent analysis algorithm, so as to realize an automatic selection of an intelligent analysis algorithm, reduce the manual workload, and improve the selection efficiency of the intelligent analysis algorithm. The specific technical solutions are as follows.

In a first aspect, an embodiment of the present disclosure provides a method for selecting an intelligent analysis algorithm, the method includes:
acquiring image data of a monitoring scene;
analyzing the image data to obtain scene contents contained in the image data;
determining an intelligent analysis algorithm corresponding to each of the scene contents; and
selecting a target intelligent analysis algorithm(s) from intelligent analysis algorithms corresponding to the scene contents according to a load capacity of a compute node used for loading the intelligent analysis algorithms, wherein a total algorithm load of the target intelligent analysis algorithm(s) is not greater than the load capacity of the compute node.

In a second aspect, an embodiment of the present disclosure provides an apparatus for selecting an intelligent analysis algorithm, the apparatus includes:
an image data acquisition module, configured to acquire image data of a monitoring scene;
a scene content determination module, configured to analyze the image data to obtain scene contents contained in the image data;
an initial algorithm determination module, configured to determine an intelligent analysis algorithm corresponding to each of the scene contents; and
a target algorithm determination module, configured to select a target intelligent analysis algorithm(s) from intelligent analysis algorithms corresponding to the scene contents according to a load capacity of a compute node used for loading the intelligent analysis algorithms, wherein a total algorithm load of the target intelligent analysis algorithm(s) is not greater than the load capacity of the compute node.

In a third aspect, an embodiment of the present disclosure provides a system for selecting an intelligent analysis algorithm, the system comprises:
a scene analysis module, configured to acquire image data of a monitoring scene; and analyze the image data to obtain scene contents contained in the image data; and
a resource scheduling module, configured to determine an intelligent analysis algorithm corresponding to each of the scene contents; select a target intelligent analysis algorithm(s) from intelligent analysis algorithms corresponding to the scene contents according to a load capacity of a compute node used for loading the intelligent analysis algorithms, wherein a total algorithm load of the target intelligent analysis algorithm(s) is not greater than the load capacity of the compute node; and load the target intelligent analysis algorithm(s) using the compute node.

In a fourth aspect, an embodiment of the present disclosure provides an electronic device, including a processor and a memory;
the memory is configured to store a computer program; and
the processor is configured to implement any of the method for selecting an intelligent analysis algorithm described above when executing the computer program stored in the memory.

In a fifth aspect, an embodiment of the present disclosure provides a computer-readable storage medium having a computer program stored thereon, which when executed by a processor, cause any of the methods for selecting an intelligent analysis algorithm described above to be implemented.

The embodiments of the present disclosure provide a method, an apparatus, a system, and an electronic device for selecting an intelligent analysis algorithm. The method includes: acquiring image data of a monitoring scene; analyzing the image data to obtain scene contents contained in the image data; determining an intelligent analysis algorithm corresponding to each of the scene contents; and selecting a target intelligent analysis algorithm(s) from intelligent analysis algorithms corresponding to the scene contents according to a load capacity of a compute node used for loading the intelligent analysis algorithms, wherein a total algorithm load of the target intelligent analysis algorithm(s) is not greater than the load capacity of the compute node. The present disclosure realizes an automatic selection of the intelligent analysis algorithm, which can reduce the manual workload and improve the selection efficiency of the intelligent analysis algorithm. The total algorithm load of the target intelligent analysis algorithm(s) is not greater than the load capacity of the compute node, which can reduce the overload of the compute node, reduce abnormal analysis results caused by the overload of the compute node, and reduce an improper selection of the intelligent analysis algorithm due to the low degree of professionalism of the construction personnel, which affects the analysis effect. Of course, implementing any product or method of the present disclosure does not necessarily require achieving all of the advantages described above at the same time.

BRIEF DESCRIPTION OF THE DRAWINGS

In order to more clearly illustrate the technical solutions of the embodiments of the present disclosure and related art, the drawings used in the embodiments and related art are described briefly below. Obviously, the drawings in the following description are only some embodiments of the present disclosure, and other drawings can be obtained by those skilled in the art based on these drawings without creative efforts.

FIG. 3B is a first schematic flowchart of a specific implementation of step S302 in the embodiment shown in FIG. 3a;

FIG. 3C is a second schematic flowchart of a specific implementation of step S302 in the embodiment shown in FIG. 3a;

FIG. 3D is a third schematic flowchart of a specific implementation of step S302 in the embodiment shown in FIG. 3a;

FIG. 4 is a fourth schematic flowchart of a specific implementation of step S302 in the embodiment shown in FIG. 3a;

DETAILED DESCRIPTION

Figure 1:
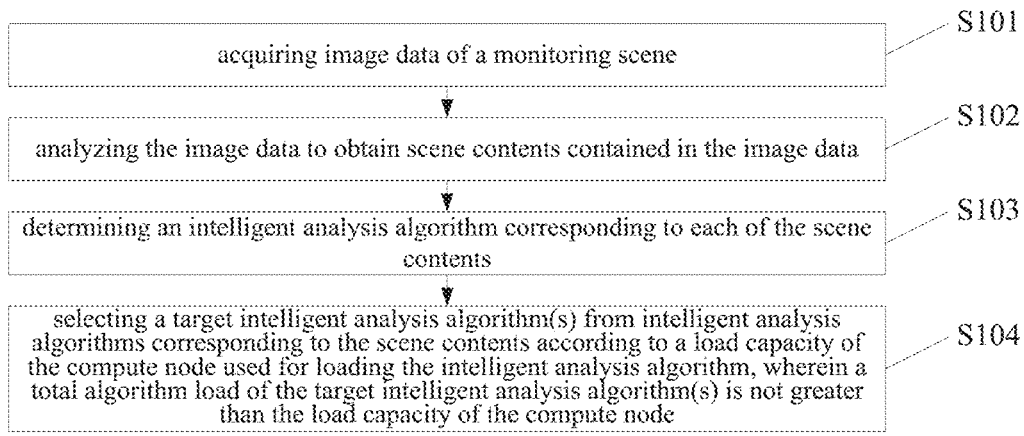
FIG. 1 is a first schematic flowchart of a method for selecting an intelligent analysis algorithm according to an embodiment of the present disclosure.

In order to make the object, technical solutions, and advantages of the present disclosure clearer, the present disclosure will be described below in detail with reference to the accompanying drawings and embodiments. Obviously, the embodiments described are only a part of the embodiments of the present disclosure, rather than all the embodiments. Based on the embodiments in the present disclosure, all other embodiments obtained by those skilled in the art without creative efforts fall within the protection scope of the present disclosure.

First, technical terms used in the embodiments of the present disclosure are explained below.

Scene analysis: a type of a current scene is identified by analyzing the scene, such as street, an intersection, indoor the house, etc., and the intelligent analysis content required by the current scene is understood by extracting the fixed content in the scene, such as a road surface, a sign (such as no parking, no smoking, etc.), a zebra crossing etc.

Algorithm resource pool: it contains a variety of algorithms and a combination of the algorithms, and can automatically form a complete set of business logic according to the logic arranged by the algorithm to realize a specific business.

In related technologies, it is necessary to manually select an intelligent analysis algorithm for each monitoring point, and manually configure and adjust it. However, manual selection of an intelligent analysis algorithm requires a large amount of manual work, and the selection efficiency of intelligent analysis algorithms is low, and it is often difficult for construction personnel to achieve a professional configuration of professional intelligent analysis algorithms, which makes it difficult to guarantee the effect of a large number of intelligent monitoring equipment, thus the social benefits is limited. At the same time, the development of smart chips enables one chip to provide more intelligent functions, but the matching of scenes and functions requires very professional knowledge. For large-scale projects such as the smart city and the Xueliang project, it is difficult to guarantee construction personnel with professional knowledge.

In view of this, an embodiment of the present disclosure provides a method for selecting an intelligent analysis algorithm. The method includes: acquiring image data of a monitoring scene; analyzing the image data to obtain scene contents contained in the image data; determining an intelligent analysis algorithm corresponding to each of the scene contents; and selecting a target intelligent analysis algorithm(s) from intelligent analysis algorithms corresponding to the scene contents according to a load capacity of a compute node used for loading the intelligent analysis algorithms, wherein a total algorithm load of the target intelligent analysis algorithm(s) is not greater than the load capacity of the compute node.

In the embodiment of the present disclosure, automatic loading of the intelligent analysis algorithm is realized, which can reduce the manual workload, increase the selection efficiency of the intelligent analysis algorithm, and reduce an improper selection of the intelligent analysis algorithm due to the low degree of professionalism of the construction personnel, which affects the analysis effect.

In order to describe the technical solutions of the present disclosure more clearly, a specific description is given below. The method for selecting an intelligent analysis algorithm in the embodiment of the present disclosure may be as shown in FIG. 1, and the method includes following steps.

S101: acquiring image data of a monitoring scene.

The method for selecting an intelligent analysis algorithm in this embodiment of the present disclosure may be implemented by an electronic device. Specifically, the electronic device may be a compute node that analyze a monitoring image using the intelligent analysis algorithm, for example, may be a device such as a smart camera, a hard disk video recorder, and the like.

S102: analyzing the image data to obtain scene contents contained in the image data.

The image data of the monitoring scene can be analyzed through computer vision technology, so as to determine scene contents in the image data. One piece of image data may contain one or more scene contents. The scene content is a target that can be described in natural language. For example, the scene contents may include areas (hereinafter referred to as a background partition) that need to be detected using intelligent analysis algorithms, such as sidewalk areas, non-motorway areas, motorway areas, zebra crossing areas, fire passage areas, parking space areas or elevator areas, etc. The scene contents may also include objects that one wants to detect (hereinafter referred to as a foreground object), such as pedestrians, vehicles, and the like.

In order to increase the speed and accuracy of the detection of the scene contents, in one possible implementation, a scene type of the image data may be determined by using the computer vision technology; and then, based on the scene type of the image data, a target detection is performed on the image data to obtain the scene contents in the image data.

The image data can be analyzed by using the computer vision technology such as a deep learning model, so as to determine the scene type of the image data (monitoring scene). The scene type can be set according to actual scenes in applications, for example, the scene type may include a street, an intersection, indoor the house, etc. Based on the scene type of the image data, further detection is performed on the image data, so as to obtain the scene contents in the image data. For example, when the scene type of the image data is the street, the target detection is performed on the image data by using a target detection algorithm for a street scene, so as to determine the scene contents in the image data. Firstly, the scene type of the image data is determined, and then the target detection is performed based on the scene type to determine the scene contents. Compared with a direct detection of the scene contents, a faster detection speed and higher accuracy are achieved.

S103: determining an intelligent analysis algorithm corresponding to each of the scene contents.

The intelligent analysis algorithm(s) corresponding to each of the scene contents in the image data is(are) determined, respectively, according to a preset corresponding relationship between the scene content and the intelligent analysis algorithm. The corresponding relationship between the scene content and the intelligent analysis algorithm can be set according to actual situations. For example, a sidewalk corresponds to a pedestrian capture algorithm, a non-motorway corresponds to a non-motor vehicle capture algorithm, a motorway corresponds to a motor vehicle capture algorithm, a fire passage corresponds to a passage occupation capture algorithm, a parking space corresponds to a parking charging algorithm, and the like.

The intelligent analysis algorithms may be pre-stored in a compute node and loaded and run by the compute node during an image analysis. Since there may be many types of intelligent analysis algorithms, in order to save the storage space of the compute node, the intelligent analysis algorithms may be uniformly stored in an algorithm resource pool from which the compute node can download corresponding intelligent analysis algorithm. The intelligent analysis algorithms in the algorithm resource pool may include target extraction algorithms, target tracking algorithms, target recognition algorithms or behavior analysis algorithms. One scene content may correspond to only one intelligent analysis algorithm, or may correspond to multiple intelligent analysis algorithms at the same time. For example, a motorway may correspond to a vehicle recognition algorithm and a vehicle tracking algorithm at the same time.

S104: selecting a target intelligent analysis algorithm(s) from intelligent analysis algorithms corresponding to the scene contents according to a load capacity of the compute node used for loading the intelligent analysis algorithm, wherein a total algorithm load of the target intelligent analysis algorithm(s) is not greater than the load capacity of the compute node.

The load capacity of the compute node used for loading the intelligent analysis algorithm is obtained. The load capacity of the compute node refers to a load capacity of the compute node configured for the monitoring scene. For example, when the compute node is a smart camera, the load capacity of the compute node is an overall load capacity of the smart camera; when the compute node is a hard disk video recorder, the load capacity of the compute node is a load capacity allocated for the monitoring scene in the hard disk video recorder.

According to a preset selection rule, a target intelligent analysis algorithm(s) is(are) selected from the intelligent analysis algorithms corresponding to each of the scene contents, wherein the total algorithm load of selected target intelligent analysis algorithm(s) is not greater than the load capacity of the compute node. The preset selection rule can be customized. For example, an importance level is set for each of the intelligent analysis algorithms in advance. An intelligent analysis algorithm with high importance level is preferentially selected as the target intelligent analysis algorithm(s) from the intelligent analysis algorithms corresponding to the scene contents without exceeding the computing capacity of the compute node. Alternatively, according to a size of an area size of the scene content, an intelligent analysis algorithm corresponding to a scene content with a large area is preferentially selected as the target intelligent analysis algorithm(s), and the like.

The algorithm load of an intelligent analysis algorithm may be an experiment value or an experience value, which can be measured through experiments or obtained according to historical data statistics. The algorithm load of the intelligent analysis algorithm can also be obtained by a test of loading and running the intelligent analysis algorithm by the compute node.

In the embodiment of the present disclosure, an automatic selection of the intelligent analysis algorithm is realized, which can reduce the manual workload and reduce an improper selection of the intelligent analysis algorithm due to the low degree of professionalism of the construction personnel, which affects the analysis effect.

After the target intelligent analysis algorithm(s) is(are) selected, it is also necessary to load the target intelligent analysis algorithm(s) by using the compute node. In a possible implementation, after the step S104, the method further includes: loading the target intelligent analysis algorithm(s) using the compute node.

After the target intelligent analysis algorithm(s) is(are) determined, the compute node loads each target intelligent analysis algorithm, so as to intelligently analyze the image data of the monitoring scene using the target intelligent analysis algorithm(s). For example, for a monitoring scene of a motorway with a parking space on the roadside, the scene content can include a motorway and a parking space, and the vehicle capture algorithm and the roadside parking charging algorithm can be loaded by the compute node, so as to detect the roadside parking charging while capturing the vehicle, thereby improving the utilization rate of monitoring equipment.

In order to make the embodiments of the present disclosure clearer, as an example, the scene content with a large area is preferentially selected, and the selection of the target intelligent analysis algorithm(s) is specifically described in the following.

Figure 2A:
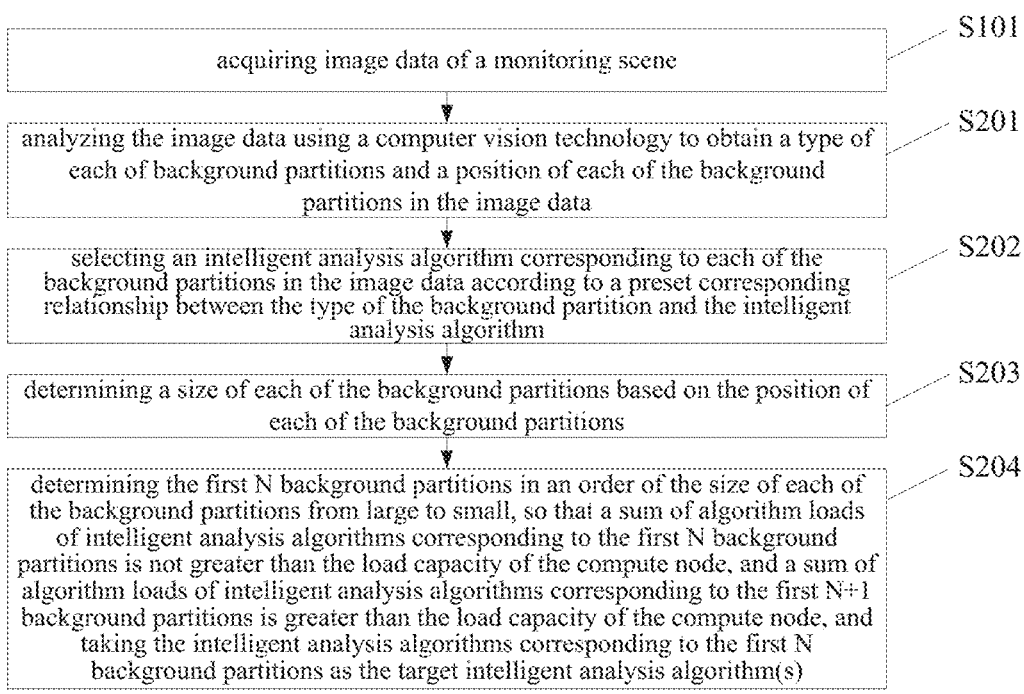
FIG. 2A is a second schematic flowchart of a method for selecting an intelligent analysis algorithm according to an embodiment of the present disclosure.

In a possible implementation, the scene content includes a background partition. Referring to FIG. 2a, where analyzing the image data to obtain scene contents contained in the image data, includes:

S201: analyzing the image data using a computer vision technology to obtain a type of each of background partitions and a position of each of the background partitions in the image data.

Figure 5:
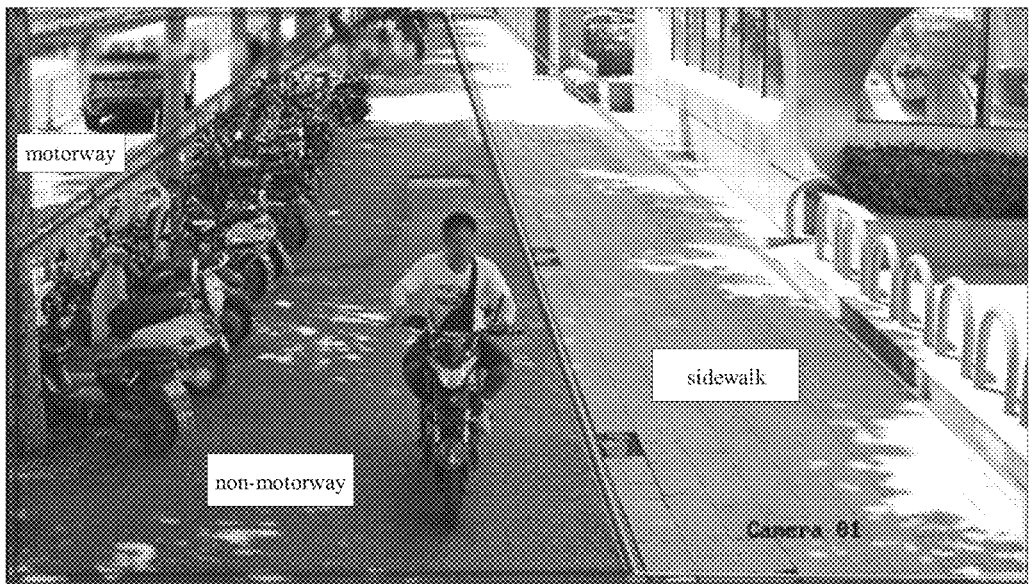
FIG. 5 is a schematic diagram of image data of a monitoring scene according to an embodiment of the present disclosure.

The scene content may include background partitions that need to be detected using the intelligent analysis algorithms. For example, the background partition may be a sidewalk area, a non-motorway area, a motorway area, a zebra crossing area, a fire passage area, a parking space area, an elevator area, etc. For example, as shown in FIG. 5, the image data includes three background partitions: a sidewalk area, a non-motorway area, and a motorway area.

In a possible implementation, where determining an intelligent analysis algorithm corresponding to each of the scene contents, includes:

S202: selecting an intelligent analysis algorithm corresponding to each of the background partitions in the image data according to a preset corresponding relationship between the type of the background partition and the intelligent analysis algorithm.

The corresponding relationship between the type of the background partition and the intelligent analysis algorithm can be set according to actual situations. For example, a sidewalk area corresponds to a pedestrian capture algorithm, a non-motorway area corresponds to a non-motor vehicle capture algorithm, a motorway area corresponds to a motor vehicle capture algorithm, a fire passage area corresponds to a passage occupation capture algorithm, a parking space area corresponds to a parking charging algorithm, etc.

In a possible implementation, where selecting a target intelligent analysis algorithm(s) from intelligent analysis algorithms corresponding to the scene contents according to a load capacity of a compute node used for loading the intelligent analysis algorithm, includes:

S203: determining a size of each of the background partitions based on the position of each of the background partitions.

The size of the background partition can be represented by the number of pixels in the background partition.

S204: determining the first N background partitions in an order of the size of each of the background partitions from large to small, so that a sum of algorithm loads of intelligent analysis algorithms corresponding to the first N background partitions is not greater than the load capacity of the compute node, and a sum of algorithm loads of intelligent analysis algorithms corresponding to the first N+1 background partitions is greater than the load capacity of the compute node, and taking the intelligent analysis algorithms corresponding to the first N background partitions as the target intelligent analysis algorithm(s).

The size of the background partition directly affects a proportion of the background partition in the image data. A larger background partition indicates a larger background partition in the monitoring scene, and the background partition can be taken as a main monitoring object. Therefore, the intelligent analysis algorithm corresponding to the background partition can be preferentially selected as the target intelligent analysis algorithm(s), and the intelligent analysis algorithms corresponding to smaller background partitions are loaded when the computing capacity of the compute node is sufficient.

The algorithm loads of the intelligent analysis algorithms corresponding to the background partitions are superimposed in turn, in an order of the background partition from large to small, to find a number N, so that a total algorithm load of the intelligent analysis algorithms corresponding to the first N background partitions is not greater than the load capacity of the compute node, while a total algorithm load of the intelligent analysis algorithms corresponding to the first N+1 background partitions is greater than the load capacity of the compute node.

For example, the image data includes two background partitions, namely, a motorway area and a non-motorway area, wherein the size of the motorway area is represented as A pixels and the size of the non-motorway area is represented as B pixels, and A>B. The intelligent analysis algorithm corresponding to the motorway can be selected as the target intelligent analysis algorithm(s). Then, if the load capacity of the compute node is still sufficient to load an intelligent analysis algorithm corresponding to the non-motorway, the intelligent analysis algorithm corresponding to the non-motorway is then selected as the target intelligent analysis algorithm(s); and if the load capacity of the compute node is insufficient to load the intelligent analysis algorithm corresponding to the non-motorway, the intelligent analysis algorithm corresponding to the non-motorway will not be selected as the target intelligent analysis algorithm(s).

In the embodiment of the present disclosure, according to the size of the background partition, an intelligent analysis algorithm corresponding to a large background partition is preferentially selected for loading, which realizes an automatic selection and loading of the intelligent analysis algorithm, and the total algorithm load of the target intelligent analysis algorithm(s) is not greater than the load capacity of the compute node, which can reduce the overload of the compute node and reduce abnormal analysis results due to the overload of the compute node.

Figure 2B:
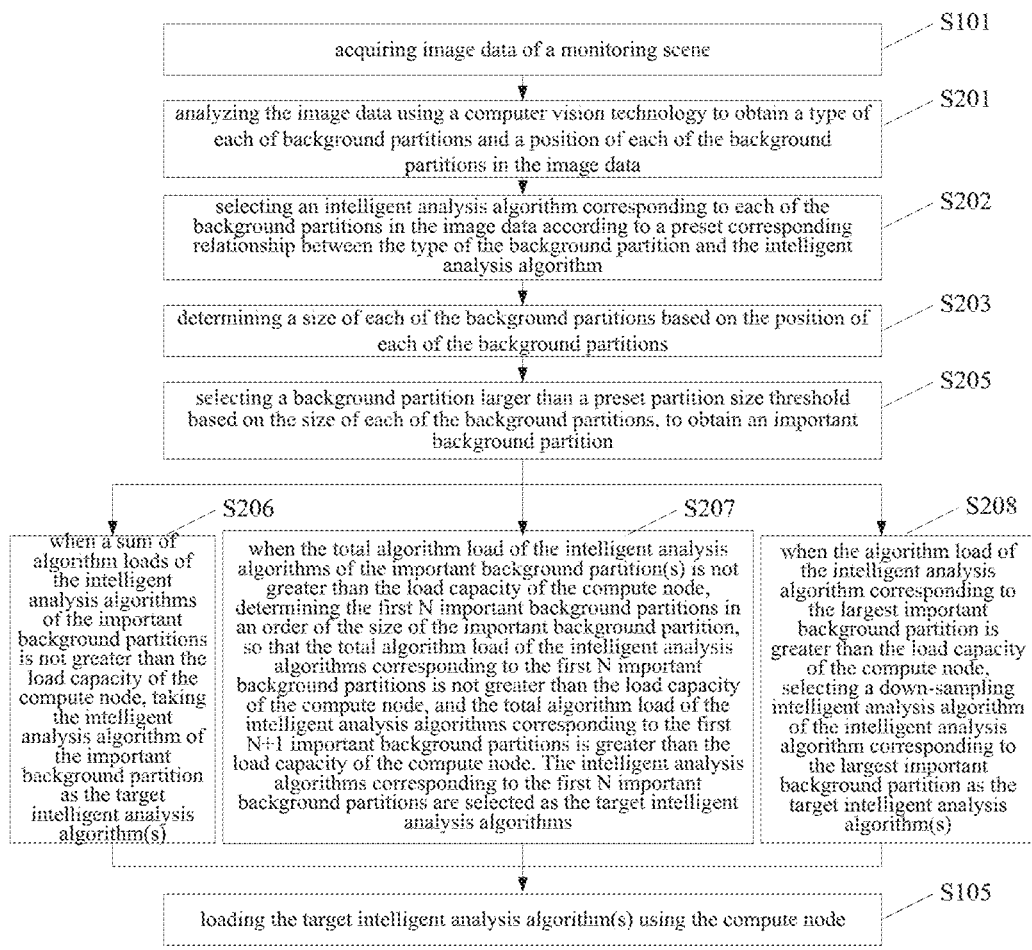
FIG. 2B is a third schematic flowchart of a method for selecting an intelligent analysis algorithm according to an embodiment of the present disclosure.

In a possible implementation, referring to FIG. 2b, where selecting a target intelligent analysis algorithm(s) from intelligent analysis algorithms corresponding to the scene contents according to a load capacity of the compute node used for loading the intelligent analysis algorithm, includes:

S203: determining a size of each of the background partitions based on the position of each of the background partitions.

S205: selecting a background partition larger than a preset partition size threshold based on the size of each of the background partitions, to obtain an important background partition.

The preset partition size threshold may be set according to the resolution of the image data of the monitoring scene. For example, the preset partition size threshold may be set as 30%, 40%, or 50% of the resolution of the image data. A background partition larger than the preset partition size threshold is selected as an important background partition. For example, as shown in FIG. 5, the image data includes three background partitions, namely, a non-motorway, a sidewalk, and a motorway. Among which, the sizes of the non-motorway and the sidewalk are larger than the preset partition size threshold, and the size of the motorway is not larger than the preset partition size threshold, thus the non-motorway and the sidewalk are selected as important background partitions.

S206: when a sum of algorithm loads of the intelligent analysis algorithms of the important background partitions is not greater than the load capacity of the compute node, taking the intelligent analysis algorithm of the important background partition as the target intelligent analysis algorithm(s).

If the load capacity of the compute node allows, intelligent analysis algorithms corresponding to other background partition(s) (hereinafter referred to as a secondary background partition) in the background partitions except the important background partition can also be loaded. In a possible implementation, the method further includes: determining a remaining load of the compute node according to the total algorithm load of the target intelligent analysis algorithm(s) and the load capacity of the compute node; selecting a first background partition from the secondary background partitions when the remaining load of the compute node is greater than a preset algorithm load threshold, and loading an intelligent analysis algorithm corresponding to the first background partition using the compute node, wherein the secondary background partition is a background partition whose size is not larger than the preset partition size threshold, and the algorithm load of the intelligent analysis algorithm corresponding to the first background partition is not greater than the remaining load of the compute node.

The algorithm load threshold can be a preset value, such as 20%, 10% or 5% of the computing capacity of the compute node. The background partition can be selected, in an order of a priority of each secondary background partition from high to low (the priority of the background partition can be customized in advance), from the secondary background partitions one by one as the first background partition, to find a number M, so that the total algorithm load of the intelligent analysis algorithms of the first M secondary background partitions is not greater than the remaining load of the compute node, and the total algorithm load of the intelligent analysis algorithms of the first M+1 secondary background partitions is greater than the remaining load of the compute node. The first M secondary background partitions are taken as the first background partition. The first background partition may also be selected in an order of the size of the secondary background partition from large to small. For example, as shown in FIG. 5, the non-motorway and the sidewalk are important scene contents, and the motorway is a secondary scene content. After the target intelligent analysis algorithms of the non-motorway and sidewalk are loaded by the compute node, if the remaining load of the compute node is still sufficient to load the intelligent analysis algorithm of the motorway, the intelligent analysis algorithm of the motorway is selected as the target intelligent analysis algorithm.

S207: when the total algorithm load of the intelligent analysis algorithms of the important background partition(s) is not greater than the load capacity of the compute node, determining the first N important background partitions in an order of the size of the important background partition, so that the total algorithm load of the intelligent analysis algorithms corresponding to the first N important background partitions is not greater than the load capacity of the compute node, and the total algorithm load of the intelligent analysis algorithms corresponding to the first N+1 important background partitions is greater than the load capacity of the compute node. The intelligent analysis algorithms corresponding to the first N important background partitions are selected as the target intelligent analysis algorithms.

The size of the important background partition here can also be replaced with the size of a foreground object in the important background partition, or a priority of each important background partition (a corresponding priority can be set for each type of background partitions in advance), etc., specific implementations of which are not repeated here.

S208: when the algorithm load of the intelligent analysis algorithm corresponding to the largest important background partition is greater than the load capacity of the compute node, selecting a down-sampling intelligent analysis algorithm of the intelligent analysis algorithm corresponding to the largest important background partition as the target intelligent analysis algorithm(s).

The down-sampling intelligent analysis algorithm for the intelligent analysis algorithm has the same algorithm type as the intelligent analysis algorithm, and the algorithm load of the down-sampling intelligent analysis algorithm of the intelligent analysis algorithm is smaller than the algorithm load of the intelligent analysis algorithm. For example, for the intelligent analysis algorithm A used for the vehicle detection, the corresponding down-sampling intelligent analysis algorithm B should also be used for the vehicle detection, but the algorithm load of the down-sampling intelligent analysis algorithm B should be smaller than the algorithm load of the intelligent analysis algorithm A. In a possible implementation, the training samples of the down-sampling intelligent analysis algorithm B can be obtained by down-sampling the training samples of the intelligent analysis algorithm A, that is, the resolution of the training samples of the down-sampling intelligent analysis algorithm B is smaller than that of the intelligent analysis algorithm A, so that the algorithm type of the intelligent analysis algorithm A is the same as that of the down-sampling intelligent analysis algorithm B, and the algorithm load of the down-sampling intelligent analysis algorithm B is smaller than that of the intelligent analysis algorithm A. Of course, the down-sampling intelligent analysis algorithm of the intelligent analysis algorithm can also be obtained by other related methods, which will not be repeated here.

In a possible implementation, referring to FIG. 2b, the method further includes S105: loading the target intelligent analysis algorithm(s) using the compute node.

In the embodiment of the present disclosure, the selection and loading of the intelligent analysis algorithm corresponding to the important background partition can be guaranteed first, and the total algorithm load of the target intelligent analysis algorithm(s) is not greater than the load capacity of the compute node, which can reduce abnormal analysis results due to the overload of the compute node.

Figure 3A:
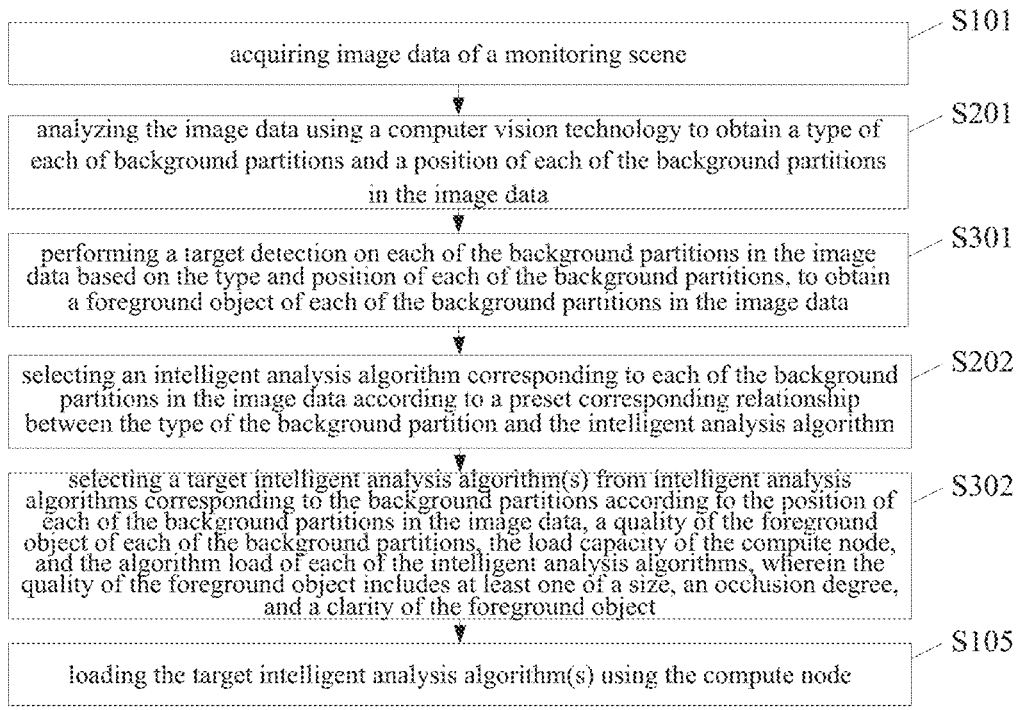
FIG. 3A is a fourth schematic flowchart of a method for selecting an intelligent analysis algorithm according to an embodiment of the present disclosure.

In a possible implementation, the scene content includes background partitions and foreground objects. Referring to FIG. 3a, where analyzing the image data using a computer vision technology to obtain a type of each of background partitions and a position of each of the background partitions in the image data, includes:

S201: analyzing the image data using a computer vision technology to obtain a type of each of background partitions and a position of each of the background partitions in the image data.

S301: performing a target detection on each of the background partitions in the image data based on the type and position of each of the background partitions, to obtain foreground objects of each of the background partitions in the image data.

In addition to the background partitions, the scene content may also include foreground objects, such as pedestrians, vehicles, etc. By acquiring the foreground objects, it can be determined whether the intelligent analysis algorithm is adapted to the foreground objects, so as to facilitate the selection of the foreground objects.

In a possible implementation, where selecting a target intelligent analysis algorithm(s) from intelligent analysis algorithms corresponding to the scene contents according to a load capacity of the compute node used for loading the intelligent analysis algorithm, includes:

S302: selecting a target intelligent analysis algorithm(s) from intelligent analysis algorithms corresponding to the background partitions according to the position of each of the background partitions in the image data, a quality of the foreground object of each of the background partitions, the load capacity of the compute node, and the algorithm load of each of the intelligent analysis algorithms, wherein the quality of the foreground object includes at least one of a size, an occlusion degree, and a clarity of the foreground object.

The quality of the foreground object may include one or more of the size, the occlusion degree, and the clarity of the foreground object, and of course other custom quality items may also be included. In order to ensure that the intelligent analysis algorithm can successfully analyze and detect the foreground object, it is necessary to ensure that the quality of the foreground object complies with preset quality rules. For example, the size of the foreground object is within the size range that can be detected by the intelligent analysis algorithm, the occlusion degree of the foreground object is less than the occlusion degree specified by the intelligent analysis algorithm, and the clarity of the foreground object is greater than a minimum clarity required by the intelligent analysis algorithm identifying an object. At the same time, the position of the background partition is also taken as a criterion for selecting the target intelligent analysis algorithm(s). For example, a closer position of the background partition to a center of a screen, indicates higher attention of the user that is drawn to the background partition. Therefore, the background partition in the center of the screen can be selected preferentially. The load capacity of the compute node and the algorithm load of each of the intelligent analysis algorithms are obtained, so as to ensure that the total algorithm load of selected target intelligent analysis algorithm(s) is not greater than the load capacity of the compute node, thereby reducing the overload of the compute node.

In a possible implementation, the method further includes S105: loading the target intelligent analysis algorithm(s) using the compute node.

In the embodiment of the present disclosure, in addition to considering the load capacity of the compute node, the position of the background partition and the quality of each foreground object are also considered comprehensively, which helps to select a more suitable intelligent analysis algorithm, and realizes the automatic selection and loading of the intelligent analysis algorithm. The total algorithm load of the target intelligent analysis algorithm(s) is not greater than the load capacity of the compute node, which can reduce the overload of the compute node, thereby reducing the abnormal analysis results due to the overload of the compute node.

Figure 3B:
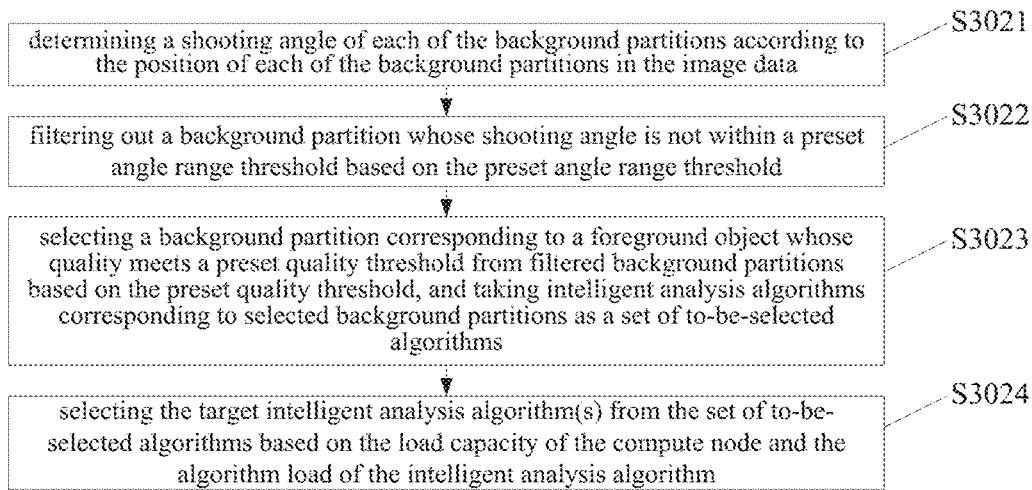

In a possible implementation, referring to FIG. 3b, where selecting a target intelligent analysis algorithm(s) from intelligent analysis algorithms corresponding to the background partitions according to the position of each of the background partitions in the image data, a quality of the foreground object of each of the background partitions, the load capacity of the compute node, and the algorithm load of each of the intelligent analysis algorithms, includes:

S3021: determining a shooting angle of each of the background partitions according to the position of each of the background partitions in the image data.

S3022: filtering out a background partition whose shooting angle is not within a preset angle range threshold based on the preset angle range threshold.

Figure 4:
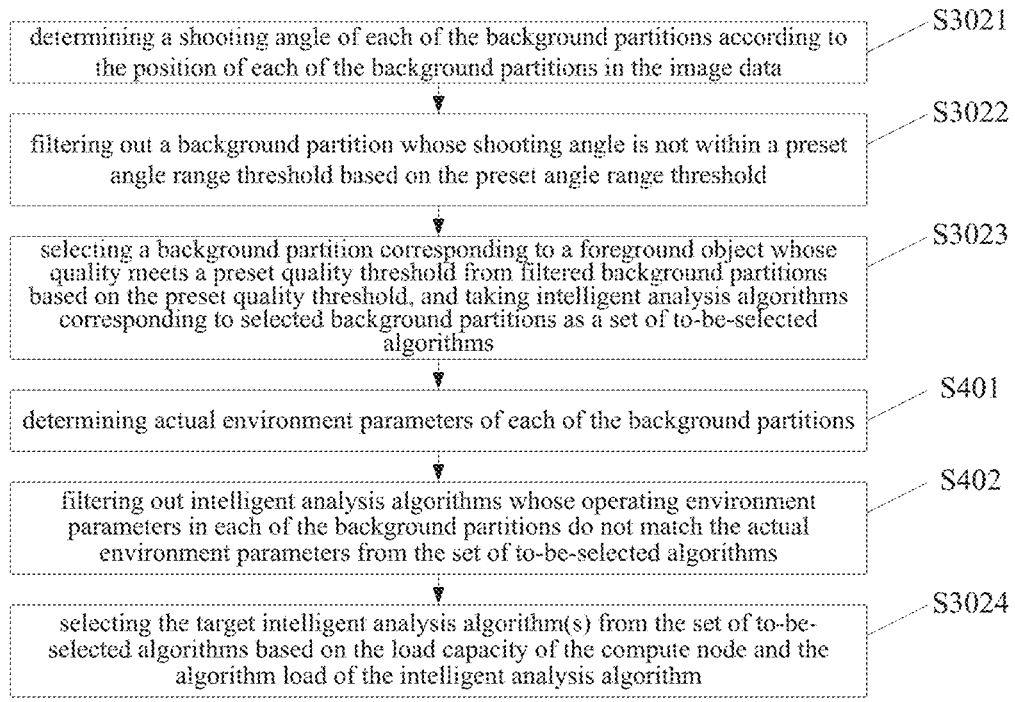

The shooting angle may be an angle between normals of an object and an image acquisition device. For example, as shown in FIG. 4, an angle a is a shooting angle of the object A. Of course, a viewing angle of the object can be taken as the shooting angle. The preset angle range threshold can be customized according to actual situations. In general, a shooting angle corresponding to the center point of the background partition can be taken as the shooting angle of the background partition; an average value of the shooting angles of each marker point in the background partition can also be taken as the shooting angle of the background partition, wherein the marker point can be customized according to actual requirements.

In some application scenarios, the shooting angle of the background partition may also be a shooting angle range of each point in the background partition. In such case, when a percentage of an overlapping interval between the shooting angle range of the background partition and the preset angle range threshold is greater than a preset percentage threshold, it is determined that the shooting angle of the background partition is within the preset angle range threshold. For example, if the shooting angle of the background partition is 70 to 80 degrees, and the preset angle range threshold is 0 to 75 degrees, then the percentage of the overlapping interval between the shooting angle range of the background partition and the preset angle range threshold is $(75-70)\div(80-70)=50\%$. If the preset percentage threshold is less than 50%, it is determined that the shooting angle of the background partition is within the preset angle range threshold; otherwise, it is determined that the shooting angle of the background partition is not within the preset angle range threshold.

S3023: selecting a background partition corresponding to a foreground object whose quality meets a preset quality threshold from filtered background partitions based on the preset quality threshold, and taking intelligent analysis algorithms corresponding to selected background partitions as a set of to-be-selected algorithms.

The quality of the foreground object includes at least one of the size, the occlusion degree, and the clarity of the foreground object, and of course, it may also include other parameters related to the quality of the object. The preset quality threshold can be customized according to actual situations. When the quality of the foreground object includes only one parameter item, it can be determined that the quality of the foreground object is higher than the preset quality threshold when the parameter item meets the preset quality threshold. For example, when the quality of the foreground object is the size of the foreground object, the preset quality threshold is a preset size threshold, and when the size of the foreground object is greater than the preset size threshold, it is determined that the quality of the foreground object meets the preset quality threshold. For example, when the quality of the foreground object is the occlusion degree of the foreground object, the preset quality threshold is a preset occlusion percentage threshold, and when the occlusion degree of the foreground object is less than the preset occlusion percentage threshold, it is determined that the quality of the foreground object meets the preset quality threshold.

When the quality of the foreground object includes multiple items, the preset quality thresholds should also include thresholds for each item. When the quality of each item of the foreground object is higher than the corresponding quality threshold, it is determined that the quality of the foreground object is higher than the preset quality threshold. For example, when the quality of the foreground object includes the size and occlusion degree of the foreground object, the preset quality threshold includes a preset size threshold and an occlusion percentage threshold. When the size of the foreground object is larger than the preset size threshold and the occlusion degree of the foreground object is smaller than the preset occlusion percentage threshold, it is determined that the quality of the foreground object is higher than the preset quality threshold.

S3024: selecting the target intelligent analysis algorithm(s) from the set of to-be-selected algorithms based on the load capacity of the compute node and the algorithm load of the intelligent analysis algorithm.

The total algorithm load of the target intelligent analysis algorithm(s) should not be greater than the load capacity of the compute node. Based on this principle, an intelligent analysis algorithm can be selected as the target intelligent analysis algorithm(s) from the set of to-be-selected algorithms according to a preset selection rule. The preset selection rule can be customized according to actual situations. For example, in the set of to-be-selected algorithms, an intelligent analysis algorithm corresponding to the largest background partition is preferentially selected as the target intelligent analysis algorithm(s); in the set of to-be-selected algorithms; alternatively, in the set of to-be-selected algorithms, an intelligent analysis algorithm corresponding to a foreground object with the highest quality is preferentially selected as the target intelligence analysis algorithms, etc. It can be understood by those skilled in the art that the higher the quality of the foreground object is, the more suitable the foreground object is to be analyzed using the intelligent analysis algorithm. For example, the smaller the occlusion degree of the foreground object is, the higher the quality of the foreground object is; and the higher the clarity of the foreground object is, the higher the quality of the foreground object is, and the like.

The following is an example to illustrate the selection based on the quality of the foreground object. In a possible implementation, referring to FIG. 3c, where selecting the target intelligent analysis algorithm(s) from the set of to-be-selected algorithms based on the load capacity of the compute node and the algorithm load of the intelligent analysis algorithm, includes:

S30241: when a sum of the algorithm loads of the intelligent analysis algorithms in the set of to-be-selected algorithms is not greater than the load capacity of the compute node, taking intelligent analysis algorithms corresponding to the background partitions in the set of to-be-selected algorithms as the target intelligent analysis algorithm(s).

S30242: when the sum of the algorithm loads of the intelligent analysis algorithms in the set of to-be-selected algorithms is greater than the load capacity of the compute node, selecting the first N intelligent analysis algorithms in an order of the quality of the foreground object corresponding to each of the intelligent analysis algorithms in the set of to-be-selected algorithms from high to low, so that a sum of the algorithm loads of the first N intelligent analysis algorithms is not greater than the load capacity of the compute node, and a sum of the algorithm loads of the first N+1 intelligent analysis algorithms is greater than the load capacity of the compute node, and taking the first N intelligent analysis algorithms as the target intelligent analysis algorithm(s).

Figure 3C:
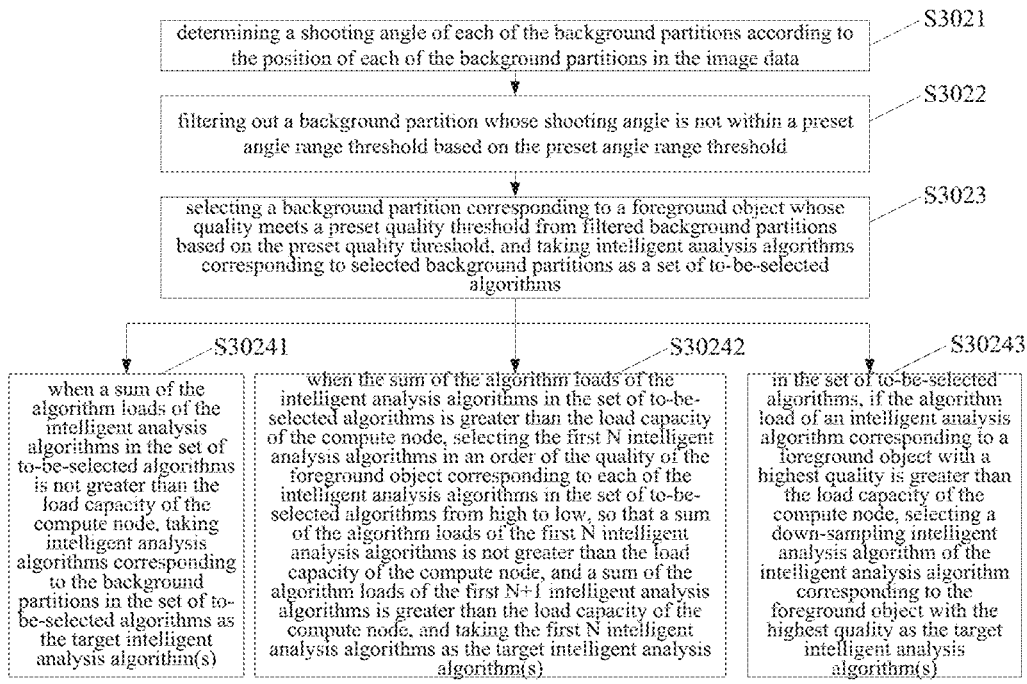

In a possible implementation, referring to FIG. 3c, the method further includes:

S30243: in the set of to-be-selected algorithms, if the algorithm load of an intelligent analysis algorithm corresponding to a foreground object with a highest quality is greater than the load capacity of the compute node, selecting a down-sampling intelligent analysis algorithm of the intelligent analysis algorithm corresponding to the foreground object with the highest quality as the target intelligent analysis algorithm(s), wherein the down-sampling intelligent analysis algorithm of the intelligent analysis algorithm has the same algorithm type as the intelligent analysis algorithm, and an algorithm load of the down-sampling intelligent analysis algorithm of the intelligent analysis algorithm is smaller than an algorithm load of the intelligent analysis algorithm.

The down-sampling intelligent analysis algorithm corresponding to the intelligent analysis algorithm has the same algorithm type as the intelligent analysis algorithm, and the algorithm load of the down-sampling intelligent analysis algorithm corresponding to the intelligent analysis algorithm is smaller than the algorithm load of the intelligent analysis algorithm.

In the embodiment of the present disclosure, when the algorithm load of the intelligent analysis algorithm corresponding to the foreground object with the highest quality is greater than the load capacity of the compute node, the corresponding down-sampling intelligent analysis algorithm is selected, so as to reduce the overload of the compute node and realize the loading and running of the intelligent analysis algorithms.

Figure 3D:
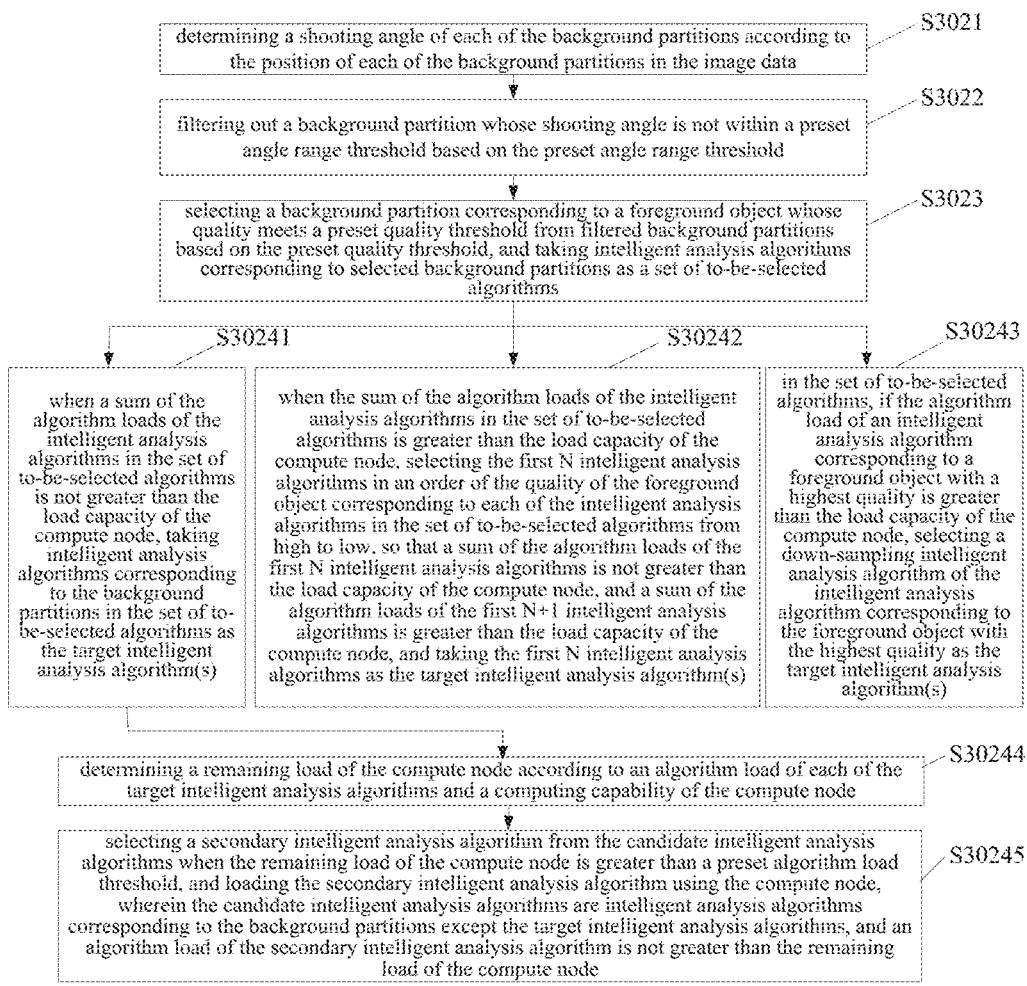

In a possible implementation, referring to FIG. 3d, the method further includes:

S30244: determining a remaining load of the compute node according to an algorithm load of each of the target intelligent analysis algorithms and a computing capability of the compute node.

S30245: selecting a secondary intelligent analysis algorithm from the candidate intelligent analysis algorithms when the remaining load of the compute node is greater than a preset algorithm load threshold, and loading the secondary intelligent analysis algorithm using the compute node, wherein the candidate intelligent analysis algorithms are intelligent analysis algorithms corresponding to the background partitions except the target intelligent analysis algorithms, and an algorithm load of the secondary intelligent analysis algorithm is not greater than the remaining load of the compute node.

In the embodiment of the present disclosure, when the computing capability of the compute node is sufficient, the computing capability of the compute node is fully utilized to implement analysis and monitoring by various algorithms.

In a possible implementation, referring to FIG. 4, the method further includes:

S401: determining actual environment parameters of each of the background partitions.

The environmental parameters of each of the background partitions can be obtained separately through a computer vision technology. The environmental parameters may include parameters such as illumination and contrast of each of the background partitions.

S402: filtering out intelligent analysis algorithms whose operating environment parameters in each of the background partitions do not match the actual environment parameters from the set of to-be-selected algorithms.

According to preset operating environment parameters of each of the intelligent analysis algorithms and the actual environment parameters of the background partition, for any background partition, filtering out the intelligent analysis algorithm from the set of to-be-selected algorithms, whose operating environment parameters do not match the actual environment parameters of the background partition.

For example, for the background partition corresponding to sidewalk, the corresponding intelligent analysis algorithm includes a nighttime pedestrian capture algorithm and a daytime pedestrian capture algorithm. The operating environment parameter of the nighttime pedestrian capture algorithm is an illumination range between c-d, and the operating environment parameter of the daytime pedestrian capture algorithm is an illumination between d-f, where f>d>c. If the actual environmental parameter of the sidewalk is brightness e, with f>e>d, it indicates that the actual environmental parameter of the sidewalk matches the operating environmental parameter of the daytime pedestrian capture algorithm, but does not match the operating environmental parameter of the nighttime pedestrian capture algorithm. Therefore, in the set of to-be-selected algorithms, the nighttime pedestrian capture algorithm corresponding to the sidewalk is filtered out.

According to the embodiment of the present disclosure, when selecting the target intelligent analysis algorithm(s), the environmental parameters are also considered, which can improve the rationality of the intelligent analysis algorithm loaded by the compute node.

Time and space statistics can be carried out on the quality of the detection results of each target intelligent analysis algorithm. When there is a significant decline in quality or quantity, an alarm signal will be issued to notify the staff to conduct manual inspections of the corresponding monitoring scene. According to the results of the space statistics, the detection area of the target intelligent analysis algorithm can be concentrated in the area with high quality, thereby saving computing capability for loading other intelligent analysis algorithms. In a possible implementation, the method further includes:

Step 1: obtaining detection results detected by the compute node by using the target intelligent analysis algorithm(s).

Step 2: determining whether quality of each of the detection results is less than a preset quality threshold.

Step 3: sending an alarm message when a proportion of the detection results whose quality are less than the preset quality threshold exceeds a preset percentage threshold.

For example, for the same area or the same shooting location, the quality of snapshots during daytime is generally high. When the quality of multiple detection results in the area drops below the preset quality threshold at a certain time during the nighttime, an alarm will be issued for this situation to notify the staff that the lighting conditions in the area are abnormal, and corresponding debugging needs to be carried out to improve the quality of the data.

The quality of the detection results may include the number of the foreground objects detected. For example, there are S pieces of data captured per unit time in a certain area or at a shooting point (capture is performed every time when a foreground object is detected), but the amount of data drops sharply (the drop is greater than a preset percentage) from a certain moment, and an alarm will be issued for this situation to notify the staff to pay attention to whether there is any network abnormality or camera abnormality in the area. If an abnormal amount of data occurred in this area or multiple areas near the shooting point at the same time, an alarm will be issued for this situation to notify the staff to pay attention to whether there is an abnormal event nearby.

In the embodiment of the present disclosure, an alarm message is sent when the quality of a large amount of detection result in multiple areas deteriorates, so as to facilitate the staff to deal with the abnormal situation.

Figure 6A:
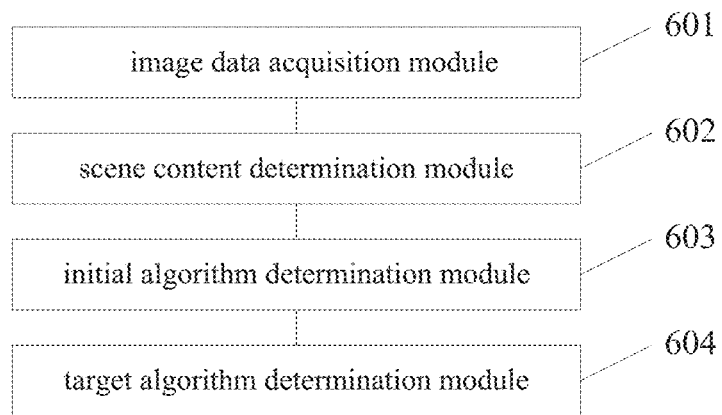
FIG. 6A is a first structural schematic diagram of an apparatus for selecting an intelligent analysis algorithm according to an embodiment of the present disclosure.

The embodiment of the present disclosure also provides an apparatus for selecting an intelligent analysis algorithm, which is applied to a compute node. Referring to FIG. 6a, the apparatus includes:
  an image data acquisition module 601, configured to acquire image data of a monitoring scene;
  a scene content determination module 602, configured to analyze the image data to obtain scene contents contained in the image data;
  an initial algorithm determination module 603, configured to determine an intelligent analysis algorithm corresponding to each of the scene contents; and
  a target algorithm determination module 604, configured to select a target intelligent analysis algorithm(s) from intelligent analysis algorithms corresponding to the scene contents according to a load capacity of the compute node used for loading the intelligent analysis algorithms, wherein a total algorithm load of the target intelligent analysis algorithm(s) is not greater than the load capacity of the compute node.

Figure 6B:
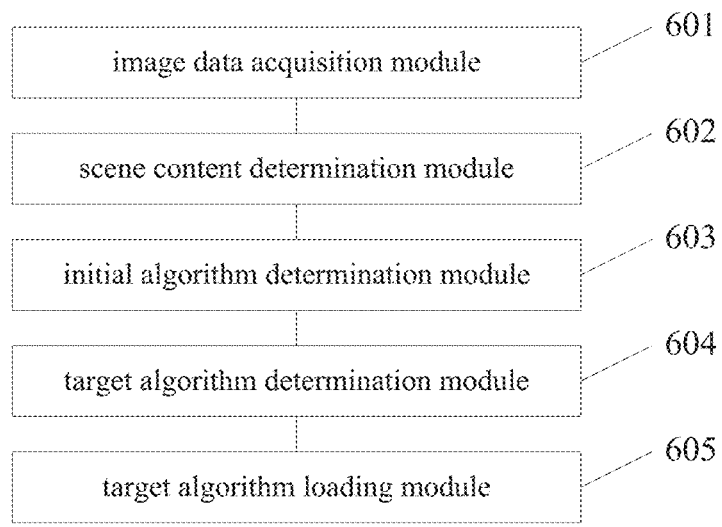
FIG. 6B is a second schematic structural diagram of an apparatus for selecting an intelligent analysis algorithm according to an embodiment of the present disclosure.

In a possible implementation, referring to FIG. 6b, the apparatus further includes a target algorithm loading module 605, configured to load the target intelligent analysis algorithm(s).

In a possible implementation, the scene contents include background partitions, and the scene content determination module 602 is specifically configured to: analyze the image data by using a computer vision technology to obtain a type of each of the background partitions and the position of each of the background partitions in the image data.

In a possible implementation, the initial algorithm determination module 603 is specifically configured to: select an intelligent analysis algorithm corresponding to each of the background partitions in the image data, according to a preset corresponding relationship between the type of each of the background partitions and the intelligent analysis algorithm.

In a possible implementation, the target algorithm determination module 604 is specifically configured to: determine a size of each of the background partitions based on the position of each of the background partitions; determine the first N background partitions in a an order of the size of each of the background partitions from large to small, so that a sum of the algorithm load of intelligent analysis algorithms corresponding to the first N background partitions is not greater than the load capacity of the compute node, and a sum of algorithm loads of intelligent analysis algorithms corresponding to the first N+1 background partitions is greater than the load capacity of the compute node, and take the intelligent analysis algorithms corresponding to the first N background partitions as the target intelligent analysis algorithm(s).

In a possible implementation, the scene contents further include a foreground object, and the scene content determination module 602 is further configured to: perform a target detection on each of the background partitions in the image data based on the type and the position of each of the background partitions, to obtain a foreground object of each of the background partitions in the image data.

In a possible implementation manner, the target algorithm determination module 604 is specifically configured to: select the target intelligent analysis algorithm(s) from intelligent analysis algorithms corresponding to the background partitions according to the position of each of the background partitions in the image data, a quality of the foreground object of each of the background partitions, the load capacity of the compute node, and an algorithm load of each of the intelligent analysis algorithms, wherein the quality of the foreground object includes at least one of a size, an occlusion degree, and a clarity of the foreground object.

In a possible implementation, the target algorithm determination module 604 includes:
  an angle calculation sub-module, configured to determine a shooting angle of each of the background partitions according to the position of each of the background partitions in the image data;
  a partition filter sub-module, configured to filter out a background partition whose shooting angle is not within a preset angle range threshold based on the preset angle range threshold;
  a set selection sub-module, configured to select a background partition corresponding to a foreground object whose quality meets a preset quality threshold from filtered background partitions based on the preset quality threshold, and take intelligent analysis algorithms corresponding to selected background partitions as a set of to-be-selected algorithms; and
  an algorithm selection sub-module, configured to select the target intelligent analysis algorithm(s) from the set of to-be-selected algorithms based on the load capacity of the compute node and the algorithm load of the intelligent analysis algorithm.

In a possible implementation, the target algorithm determination module 604 further includes:
  an algorithm filter sub-module, configured to determine actual environment parameters of each of the background partitions; and filter out the intelligent analysis algorithms whose operating environment parameters in each of the background partitions do not match the actual environment parameters from the set of to-be-selected algorithms.

In a possible implementation, the algorithm selection sub-module is specifically configured to: when a sum of the algorithm loads of the intelligent analysis algorithms in the set of to-be-selected algorithms is not greater than the load capacity of the compute node, take intelligent analysis algorithms corresponding to the background partitions in the set of to-be-selected algorithms as the target intelligent analysis algorithm(s); when the sum of the algorithm loads of the intelligent analysis algorithms in the set of to-be-selected algorithms is greater than the load capacity of the compute node, select the first N intelligent analysis algorithms in an order of a quality of a foreground object corresponding to each of the intelligent analysis algorithms in the set of to-be-selected algorithms from high to low, so that a sum of the algorithm loads of the first N intelligent analysis algorithms is not greater than the load capacity of the compute node, and a sum of the algorithm loads of the first N+1 intelligent analysis algorithms is greater than the load capacity of the compute node, and take the first N intelligent analysis algorithms as the target intelligent analysis algorithm(s).

In a possible implementation, the algorithm selecting sub-module is further configured to: in the set of to-be-selected algorithms, if the algorithm load of an intelligent analysis algorithm corresponding to a foreground object with a highest quality is greater than the load capacity of the compute node, select a down-sampling intelligent analysis algorithm of the intelligent analysis algorithm corresponding to the foreground object with the highest quality as the target intelligent analysis algorithm(s), wherein the down-sampling intelligent analysis algorithm of the intelligent analysis algorithm has the same algorithm type as the intelligent analysis algorithm, and an algorithm load of the down-sampling intelligent analysis algorithm of the intelligent analysis algorithm is smaller than an algorithm load of the intelligent analysis algorithm.

In a possible implementation, the algorithm selection sub-module is further configured to: determine a remaining load of the compute node according to an algorithm load of each of the target intelligent analysis algorithms and a computing capability of the compute node; select a secondary intelligent analysis algorithm from candidate intelligent analysis algorithms when the remaining load of the compute node is greater than a preset algorithm load threshold, and load the secondary intelligent analysis algorithm using the compute node, wherein the candidate intelligent analysis algorithms are intelligent analysis algorithms corresponding to the background partitions except the target intelligent analysis algorithms, and the algorithm load of the secondary intelligent analysis algorithm is not greater than the remaining load of the compute node.

In a possible implementation, the apparatus further includes:
  a detection result acquisition module, configured to acquire detection results detected by the compute node using the target intelligent analysis algorithm(s);
  an abnormal alarm module, configured to determine whether a quality of each of the detection results is less than a preset quality threshold; and send an alarm message when a proportion of the detection results whose quality are less than the preset quality threshold exceeds a preset percentage threshold.

Figure 7:
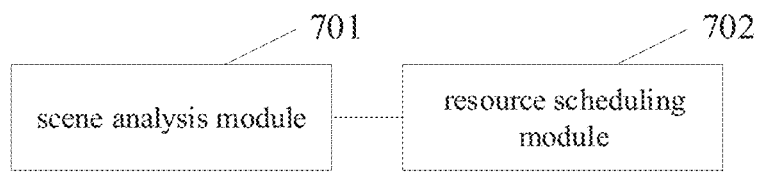
FIG. 7 is a first structural schematic diagram of a system for selecting an intelligent analysis algorithm according to an embodiment of the present disclosure.

The embodiment of the present disclosure also provides a system for selecting an intelligent analysis algorithm. Referring to FIG. 7, the system includes:
  a scene analysis module 701, configured to acquire image data of a monitoring scene; and analyze the image data to obtain scene contents contained in the image data; and
  a resource scheduling module 702, configured to determine an intelligent analysis algorithm corresponding to each of the scene contents; select a target intelligent analysis algorithm(s) from intelligent analysis algorithms corresponding to the scene contents according to a load capacity of the compute node used for loading the intelligent analysis algorithm, wherein a total algorithm load of the target intelligent analysis algorithm(s) is not greater than the load capacity of the compute node; and load the target intelligent analysis algorithm(s) by using the compute node.

Figure 8:
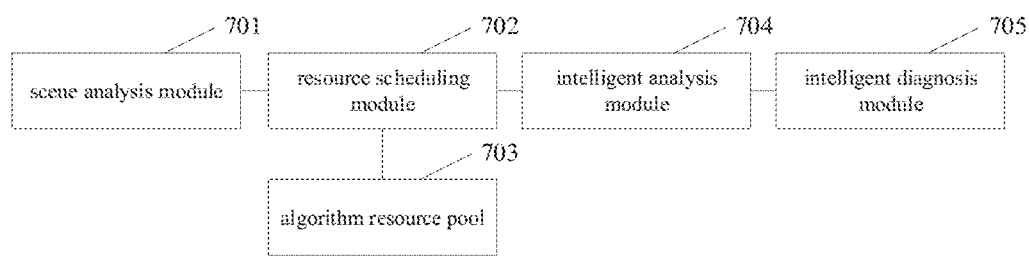
FIG. 8 is a second schematic structural diagram of a system for selecting an intelligent analysis algorithm according to an embodiment of the present disclosure.

Optionally, referring to FIG. 8, the system for selecting an intelligent analysis algorithm in the embodiment of the present disclosure further includes:
    an algorithm resource pool 703, configured to store various intelligent analysis algorithms.

Optionally, the system for selecting an intelligent analysis algorithm in the embodiment of the present disclosure further includes:
    an intelligent analysis module 704, configured to obtain detection results detected by the compute node by using the target intelligent analysis algorithm(s); and generate a quality evaluation of each of the detection results.

The intelligent analysis module 704 has the same function as an intelligent analysis module in the prior art, and can perform quality analysis on the output of the target intelligent analysis algorithm(s), such as evaluating the clarity, the angle, and the occlusion degree of a captured object.

Optionally, the system for selecting an intelligent analysis algorithm in the embodiment of the present disclosure further includes:
    an intelligent diagnosis module 705, configured to obtain detection results detected by the compute node by using the target intelligent analysis algorithm(s); determine whether a quality of each of the detection results is less than a preset quality threshold; and send an alarm message when a proportion of the detection results whose quality are less than the preset quality threshold exceeds a preset percentage threshold.

Optionally, the scene content includes background partitions, and the scene analysis module is specifically configured to: analyze the image data using a computer vision technology to obtain the type of each of the background partitions and a position of each of the background partitions in the image data.

Optionally, the resource scheduling module is specifically configured to: select an intelligent analysis algorithm corresponding to each of the background partitions in the image data, according to a preset corresponding relationship between the type of each of the background partitions and the intelligent analysis algorithm.

Optionally, the resource scheduling module is specifically configured to: determine a size of each of the background partitions based on the position of each of the background partitions; determine the first N background partitions in a an order of the size of each of the background partitions from large to small, so that a sum of algorithm loads of intelligent analysis algorithms corresponding to the first N background partitions is not greater than the load capacity of the compute node, and a sum of algorithm loads of intelligent analysis algorithms corresponding to the first N+1 background partitions is greater than the load capacity of the compute node, and take the intelligent analysis algorithms corresponding to the first N background partitions as the target intelligent analysis algorithm(s).

Optionally, the scene contents further include a foreground object, and the scene analysis module is further configured to: perform a target detection on each of the background partitions in the image data based on the type and the position of each of the background partitions, to obtain a foreground object of each of the background partitions in the image data.

Optionally, the resource scheduling module is specifically configured to: select the target intelligent analysis algorithm(s) from intelligent analysis algorithms corresponding to the background partitions according to the position of each of the background partitions in the image data, a quality of the foreground object of each of the background partitions, the load capacity of the compute node, and an algorithm load of each of the intelligent analysis algorithms, wherein the quality of the foreground object includes at least one of a size, an occlusion degree, and a clarity of the foreground object.

Optionally, the resource scheduling module is specifically configured to: determine a shooting angle of each of the background partitions according to the position of each of the background partitions in the image data; filter out a background partition whose shooting angle is not within a preset angle range threshold based on the preset angle range threshold; select a background partition corresponding to a foreground object whose quality meets a preset quality threshold from the filtered background partitions based on the preset quality threshold; take intelligent analysis algorithms corresponding to selected background partitions as a set of to-be-selected algorithms; and select the target intelligent analysis algorithm(s) from the set of to-be-selected algorithms based on the load capacity of the compute node and the algorithm load of the intelligent analysis algorithm.

Optionally, each of the intelligent analysis algorithms corresponds to corresponding operating environment parameters, and the resource scheduling module is further configured to: determine actual environment parameters of each of the background partitions; and filter out intelligent analysis algorithms whose operating environment parameters in each of the background partitions do not match the actual environment parameters from the set of to-be-selected algorithms.

Optionally, the resource scheduling module is specifically configured to: when a sum of the algorithm loads of the intelligent analysis algorithms in the set of to-be-selected algorithms is not greater than the load capacity of the compute node, take intelligent analysis algorithms corresponding to the background partitions in the set of to-be-selected algorithms as the target intelligent analysis algorithm(s); and when the sum of the algorithm loads of the intelligent analysis algorithms in the set of to-be-selected algorithms is greater than the load capacity of the compute node, select the first N intelligent analysis algorithms in an order of the quality of the foreground object corresponding to each of the intelligent analysis algorithms in the set of to-be-selected algorithms from high to low, so that the sum of the algorithm loads of the first N intelligent analysis algorithms is not greater than the load capacity of the compute node, and the sum of the algorithm loads of the first N+1 intelligent analysis algorithms is greater than the load capacity of the compute node, and take the first N intelligent analysis algorithms as the target intelligent analysis algorithm(s).

Optionally, the resource scheduling module is further configured to: in the set of to-be-selected algorithms, if the algorithm load of the intelligent analysis algorithm corresponding to the foreground object with the highest quality is greater than the load capacity of the compute node, select a down-sampling intelligent analysis algorithm of the intelligent analysis algorithm corresponding to the foreground object with the highest quality as the target intelligent analysis algorithm(s), wherein the down-sampling intelligent analysis algorithm of the intelligent analysis algorithm has the same algorithm type as the intelligent analysis algorithm, and the algorithm load of the down-sampling intelligent analysis algorithm of the intelligent analysis algorithm is smaller than an algorithm load of the intelligent analysis algorithm.

Optionally, the resource scheduling module is further configured to: determine a remaining load of the compute node according to the algorithm load of each of the target intelligent analysis algorithms and a computing capability of the compute node; select a secondary intelligent analysis algorithm from the candidate intelligent analysis algorithms when the remaining load of the compute node is greater than a preset algorithm load threshold, and load the secondary intelligent analysis algorithm using the compute node, wherein the candidate intelligent analysis algorithms are intelligent analysis algorithms corresponding to the background partitions except the target intelligent analysis algorithm(s), and the algorithm load of the secondary intelligent analysis algorithm is not greater than the remaining load of the compute node.

Optionally, the resource scheduling module 702 can also implement any of the above method for selecting an intelligent analysis algorithm.

Embodiments of the present disclosure also provide an electronic device, including a processor and a memory;
the above memory is configured to store computer programs; and
the above processor is configured to implement any of the above methods for selecting an intelligent analysis algorithm when executing the computer programs stored in the above memory.

Figure 9:
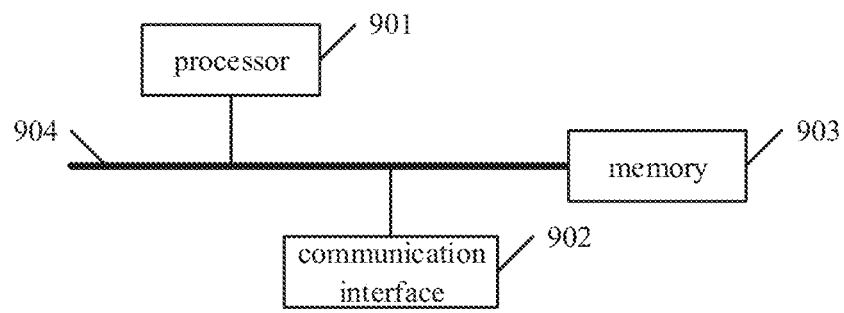
FIG. 9 is a schematic structural diagram of an electronic device according to an embodiment of the present disclosure.

Optionally, referring to FIG. 9, the electronic device in the embodiment of the present disclosure further includes a communication interface 902 and a communication bus 904, wherein the processor 901, the communication interface 902, and the memory 903 communicate with each other through the communication bus 904.

The communication bus mentioned in the above electronic device may be a Peripheral Component Interconnect (PCI) bus or an Extended Industry Standard Architecture (EISA) bus or the like. The communication bus can be divided into an address bus, a data bus, a control bus, and the like. For ease of presentation, only one thick line is used in the figure, but it does not mean that there is only one bus or one type of bus.

The communication interface is used for communication between the above electronic device and other devices.

The memory may include Random Access Memory (RAM), or may include Non-Volatile Memory (NVM), for example, at least one disk memory. Optionally, the memory may also be at least one storage device located away from the aforementioned processor.

The above processor may be a general-purpose processor, including a Central Processing Unit (CPU), an Network Processor (NP), etc.; it may also be a Digital Signal Processing (DSP), an Application Specific Integrated Circuit (ASIC), Field-Programmable Gate Array (FPGA) or other programmable logic devices, discrete gate or transistor logic devices, discrete hardware components.

Embodiments of the present disclosure further provide a computer-readable storage medium, where a computer programs is stored in the computer-readable storage medium, and when executed by a processor, the computer program implements any one of the foregoing methods for selecting an intelligent analysis algorithm.

Embodiments of the present disclosure further provide a computer program product, which implements any of the above methods for selecting an intelligent analysis algorithm when the computer program product is executed by a processor.

It should be noted that, herein, the technical features in each optional solution can be combined to form solutions as long as they are not contradictory, and these solutions are all within the scope of the disclosure of the present application.

It is further noted that relational terms herein such as first and second and the like are only used to distinguish one entity or operation from another entity or operation, and do not necessarily require or imply any such actual relationship or order between these entities or operations. Also, the terms "comprise", "include", or any other variation thereof, are intended to cover a non-exclusive inclusion, such that a process, method, article, or device that comprises a series of elements includes not only those elements but also other elements not expressly listed or inherent to such process, method, article, or device. Without further limitation, the element defined by the phrase "including a . . . " does not exclude the presence of other identical elements in the process, method, article, or device including the element.

All the embodiments in the present specification are described in a related way, and the same and similar parts among the embodiments can be referred to each other, and each embodiment focuses on differences from other embodiments.

The embodiments are only preferred embodiments of the present disclosure, and are not intended to limit the protection scope of the present disclosure. Any modification, equivalent substitution, improvement, etc. made within the spirit and principles of the present disclosure are contained in the protection scope of the present disclosure.

What is claimed is:

1. A method for selecting an intelligent analysis algorithm, comprising:
acquiring image data of a monitoring scene;
analyzing the image data to obtain scene contents contained in the image data;
determining an intelligent analysis algorithm corresponding to each of the scene contents; and
selecting a target intelligent analysis algorithm(s) from intelligent analysis algorithms corresponding to the scene contents according to a load capacity of a compute node used for loading the intelligent analysis algorithms, wherein a total algorithm load of the target intelligent analysis algorithm(s) is not greater than the load capacity of the compute node,
wherein, the scene contents comprise background partitions, and analyzing the image data to obtain scene contents contained in the image data comprises:
analyzing the image data using a computer vision technology to obtain a type of each of the background partitions and a position of each of the background partitions in the image data,
wherein the scene contents further comprise foreground objects, and after analyzing the image data using a computer vision technology to obtain a type of each of the background partitions and a position of each of the background partitions in the image data, the method further comprises:
performing a target detection on each of the background partitions in the image data based on the type and the position of each of the background partitions, to obtain a foreground object of each of the background partitions in the image data;
wherein selecting a target intelligent analysis algorithm(s) from intelligent analysis algorithms corresponding to the scene contents according to a load capacity of a compute node used for loading the intelligent analysis algorithms comprises:
selecting the target intelligent analysis algorithm(s) from intelligent analysis algorithms corresponding to the background partitions according to the position of each of the background partitions in the image data, a quality of the foreground object of each of the background partitions, the load capacity of the compute node, and an algorithm load of each of the intelligent analysis algorithms, wherein the quality of the foreground object comprises at least one of a size, an occlusion degree, and a clarity of the foreground object;

wherein selecting the target intelligent analysis algorithm(s) from intelligent analysis algorithms corresponding to the background partitions according to the position of each of the background partitions in the image data, a quality of the foreground object of each of the background partitions, the load capacity of the compute node, and an algorithm load of each of the intelligent analysis algorithms comprises:

determining a shooting angle of each of the background partitions according to the position of each of the background partitions in the image data;

filtering out a background partition whose shooting angle is not within a preset angle range threshold based on the preset angle range threshold;

selecting a background partition corresponding to a foreground object whose quality meets a preset quality threshold from filtered background partitions based on the preset quality threshold; taking intelligent analysis algorithms corresponding to selected background partitions as a set of to-be-selected algorithms; and selecting the target intelligent analysis algorithm(s) from the set of to-be-selected algorithms based on the load capacity of the compute node and the algorithm load of the intelligent analysis algorithm.

2. The method of claim 1, wherein determining an intelligent analysis algorithm corresponding to each of the scene contents comprises:

selecting an intelligent analysis algorithm corresponding to each of the background partitions in the image data, according to a preset corresponding relationship between the type of each of the background partitions and the intelligent analysis algorithm.

3. The method of claim 1, wherein selecting a target intelligent analysis algorithm(s) from intelligent analysis algorithms corresponding to the scene contents according to a load capacity of a compute node used for loading the intelligent analysis algorithms comprises:

determining a size of each of the background partitions based on the position of each of the background partitions;

determining the first N background partitions in a an order of the size of each of the background partitions from large to small, so that a sum of algorithm loads of intelligent analysis algorithms corresponding to the first N background partitions is not greater than the load capacity of the compute node, and a sum of algorithm loads of intelligent analysis algorithms corresponding to the first N+1 background partitions is greater than the load capacity of the compute node, and taking the intelligent analysis algorithms corresponding to the first N background partitions as the target intelligent analysis algorithm(s).

4. The method of claim 1, wherein each of the intelligent analysis algorithms corresponds to corresponding operating environment parameters, and before selecting the target intelligent analysis algorithm(s) from the set of to-be-selected algorithms based on the load capacity of the compute node and the algorithm load of the intelligent analysis algorithm, the method further comprises:

determining actual environment parameters of each of the background partitions; and filtering out intelligent analysis algorithms whose operating environment parameters in each of the background partitions do not match the actual environment parameters from the set of to-be-selected algorithms.

5. The method of claim 1, wherein selecting the target intelligent analysis algorithm(s) from the set of to-be-selected algorithms based on the load capacity of the compute node and the algorithm load of the intelligent analysis algorithm comprises:

when a sum of algorithm loads of the intelligent analysis algorithms in the set of to-be-selected algorithms is not greater than the load capacity of the compute node, taking intelligent analysis algorithms corresponding to the background partitions in the set of to-be-selected algorithms as the target intelligent analysis algorithm(s); and when the sum of the algorithm loads of the intelligent analysis algorithms in the set of to-be-selected algorithms is greater than the load capacity of the compute node, selecting the first N intelligent analysis algorithms in an order of a quality of a foreground object corresponding to each of the intelligent analysis algorithms in the set of to-be-selected algorithms from high to low, so that a sum of algorithm loads of the first N intelligent analysis algorithms is not greater than the load capacity of the compute node, and a sum of algorithm loads of the first N+1 intelligent analysis algorithms is greater than the load capacity of the compute node, and taking the first N intelligent analysis algorithms as the target intelligent analysis algorithm(s).

6. The method of claim 5, wherein the method further comprises:

in the set of to-be-selected algorithms, if an algorithm load of an intelligent analysis algorithm corresponding to a foreground object with a highest quality is greater than the load capacity of the compute node, selecting a down-sampling intelligent analysis algorithm of the intelligent analysis algorithm corresponding to the foreground object with the highest quality as the target intelligent analysis algorithm(s), wherein the down-sampling intelligent analysis algorithm of the intelligent analysis algorithm has the same algorithm type as the intelligent analysis algorithm, and an algorithm load of the down-sampling intelligent analysis algorithm of the intelligent analysis algorithm is smaller than that of the intelligent analysis algorithm.

7. The method of claim 5, wherein the method further comprises:

determining a remaining load of the compute node according to an algorithm load of each of the target intelligent analysis algorithms and a computing capability of the compute node;

selecting a secondary intelligent analysis algorithm from candidate intelligent analysis algorithms when the remaining load of the compute node is greater than a preset algorithm load threshold, and loading the secondary intelligent analysis algorithm using the compute node, wherein the candidate intelligent analysis algorithms are intelligent analysis algorithms corresponding to the background partitions except the target intelligent analysis algorithms, and an algorithm load of the secondary intelligent analysis algorithm is not greater than the remaining load of the compute node.

8. An electronic device, comprising a processor and a memory; wherein the memory is configured to store a computer program; and the processor is configured to implement the method for selecting an intelligent analysis algorithm of claim 1 when executing the computer program stored in the memory.

9. A non-transitory computer-readable storage medium having a computer program stored thereon, which when executed by a processor, cause the method for selecting an intelligent analysis algorithm of claim 1 to be implemented.

10. A system for selecting an intelligent analysis algorithm, comprising:

a scene analysis module, configured to acquire image data of a monitoring scene; and analyze the image data to obtain scene contents contained in the image data; and a resource scheduling module, configured to determine an intelligent analysis algorithm corresponding to each of the scene contents; select a target intelligent analysis algorithm(s) from intelligent analysis algorithms corresponding to the scene contents according to a load capacity of a compute node used for loading the intelligent analysis algorithms, wherein a total algorithm load of the target intelligent analysis algorithm(s) is not greater than the load capacity of the compute node; and load the target intelligent analysis algorithm(s) using the compute node;

wherein, the scene contents comprise background partitions, and the scene analysis module is specifically configured to analyze the image data using a computer vision technology to obtain a type of each of the background partitions and a position of each of the background partitions in the image data;

wherein the scene contents further comprise foreground objects, and the scene analysis module is further configured to perform a target detection on each of the background partitions in the image data based on the type and the position of each of the background partitions, to obtain a foreground object of each of the background partitions in the image data;

wherein the resource scheduling module is specifically configured to select the target intelligent analysis algorithm(s) from intelligent analysis algorithms corresponding to the background partitions according to the position of each of the background partitions in the image data, a quality of the foreground object of each of the background partitions, the load capacity of the compute node, and an algorithm load of each of the intelligent analysis algorithms, wherein the quality of the foreground object comprises at least one of a size, an occlusion degree, and a clarity of the foreground object;

wherein the resource scheduling module is specifically configured to determine a shooting angle of each of the background partitions according to the position of each of the background partitions in the image data; filter out a background partition whose shooting angle is not within a preset angle range threshold based on the preset angle range threshold; select a background partition corresponding to a foreground object whose quality meets a preset quality threshold from filtered background partitions based on the preset quality threshold; take intelligent analysis algorithms corresponding to selected background partitions as a set of to-be-selected algorithms; and select the target intelligent analysis algorithm(s) from the set of to-be-selected algorithms based on the load capacity of the compute node and the algorithm load of the intelligent analysis algorithm.

11. The system of claim 10, wherein the system further comprises:

an intelligent analysis module, configured to obtain detection results detected by the compute node by using the target intelligent analysis algorithm(s); and generate a quality evaluation of each of the detection results.

12. The system of claim 10, wherein the system further comprises:

an intelligent diagnosis module, configured to obtain detection results detected by the compute node by using the target intelligent analysis algorithm(s); determine whether a quality of each of the detection results is less than a preset quality threshold; and send an alarm message when a proportion of the detection results whose quality are less than the preset quality threshold exceeds a preset percentage threshold.

13. The system of claim 10, wherein the resource scheduling module is specifically configured to select an intelligent analysis algorithm corresponding to each of the background partitions in the image data, according to a preset corresponding relationship between the type of each of the background partitions and the intelligent analysis algorithm.

14. The system of claim 10, wherein the resource scheduling module is specifically configured to determine a size of each of the background partitions based on the position of each of the background partitions; determine the first N background partitions in a an order of the size of each of the background partitions from large to small, so that a sum of algorithm loads of intelligent analysis algorithms corresponding to the first N background partitions is not greater than the load capacity of the compute node, and a sum of algorithm loads of intelligent analysis algorithms corresponding to the first N+1 background partitions is greater than the load capacity of the compute node, and take the intelligent analysis algorithms corresponding to the first N background partitions as the target intelligent analysis algorithm(s).

\* \* \* \* \*